US006049305A

United States Patent [19]

Tassoudji et al.

[11] Patent Number: 6,049,305

[45] Date of Patent: Apr. 11, 2000

[54] COMPACT ANTENNA FOR LOW AND MEDIUM EARTH ORBIT SATELLITE COMMUNICATION SYSTEMS

[75] Inventors: Mohammad A. Tassoudji, Cardiff; Ernest T. Ozaki, Poway; William R. Panton, San Diego, all of Calif.

[73] Assignee: QUALCOMM Incorporated, San Diego, Calif.

[21] Appl. No.: 09/163,850

[22] Filed: Sep. 30, 1998

[51] Int. Cl.[7] .............................. H04B 7/185; G01S 5/02

[52] U.S. Cl. .............. 342/357.16; 343/895; 343/700 MS

[58] Field of Search .................................... 342/357, 359, 342/352, 357.16; 343/895, 700 MS

[56] References Cited

U.S. PATENT DOCUMENTS

| | | | |
|---|---|---|---|
| 5,434,581 | 7/1995 | Raguenet et al. | 343/700 MS |
| 5,831,577 | 11/1998 | Nichols et al. | 342/357 |
| 5,838,282 | 11/1998 | Lalezari et al. | 343/727 |
| 5,838,285 | 11/1998 | Tay et al. | 343/895 |
| 5,874,927 | 2/1999 | Knowles et al. | 343/895 |

*Primary Examiner*—Theodore M. Blum
*Attorney, Agent, or Firm*—Philips R. Wadsworth; Gregory D. Ogrod

[57] ABSTRACT

A compact, low cost antenna communicates with low and medium earth orbit satellites. The antenna includes a plurality of micro-strip elements arranged about an axis and positioned to illuminate upper elevation angles. The micro-strip elements are perpendicular to each other and are oriented toward the horizon at 90 degree increments. Furthermore, the micro-strip elements are tilted at a 50 degree angle. A quadrifilar helix is positioned at the center of the micro-strip elements and positioned to illuminate lower elevation angles. The micro-strip elements generate an omni-directional field pattern in the azimuth plane. The quadrifilar helix generates a high-gain, narrow beam-width field pattern that is also omni-directional in the azimuth plane. The antenna provides improved immunity to specular ground reflections by limiting reception of signals below a threshold elevation angle. Also, the antenna provides continuous, uninterrupted communications by eliminating "dead" period associated with conventional parabolic dish antennas.

31 Claims, 8 Drawing Sheets

FIG. 5
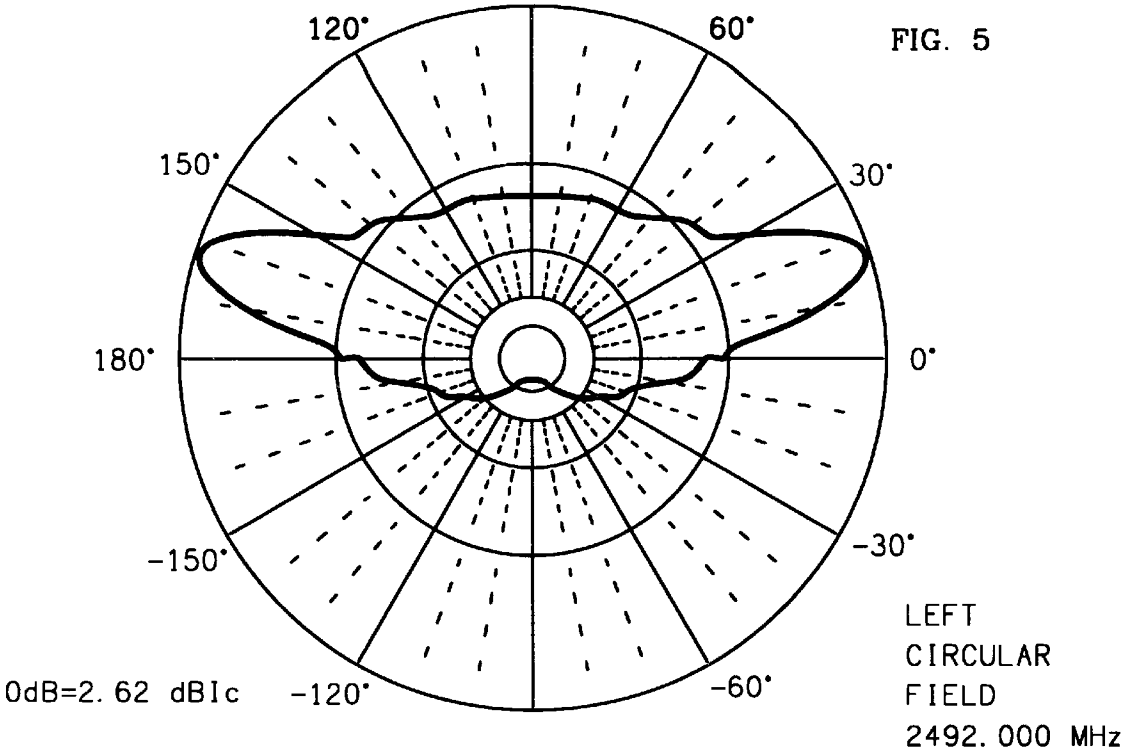
LEFT
CIRCULAR
FIELD
2492.000 MHz
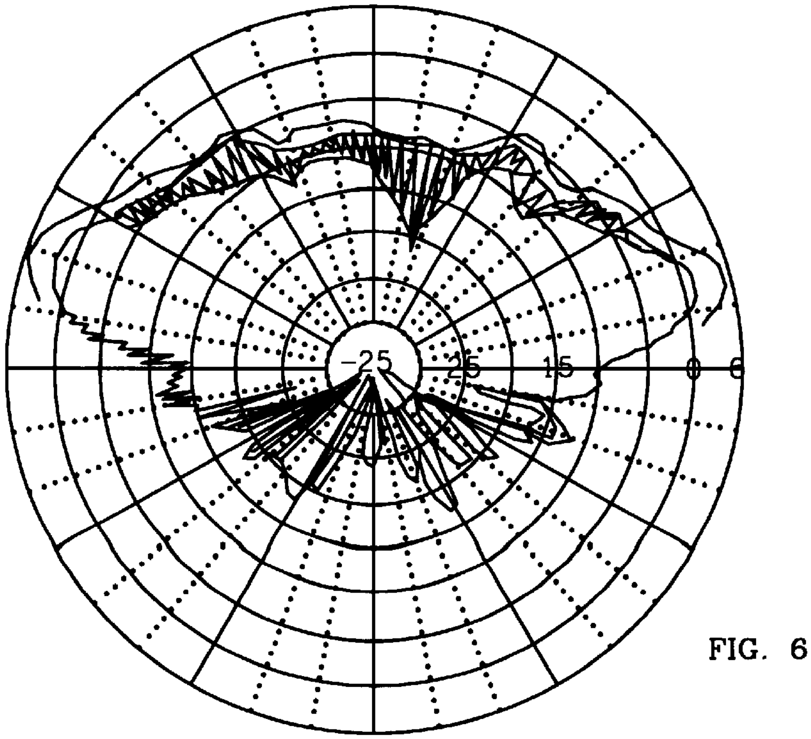
FIG. 6

SIDE PATCH CONTOUR
PATTERN, ELEMENT TILTED
30° FROM HORIZON

DMAX=9.912, DAVG=7.99, DMIN=4.54

COMPACT ANTENNA FOR LOW AND MEDIUM EARTH ORBIT SATELLITE COMMUNICATION SYSTEMS

CROSS-REFERENCE TO RELATED APPLICATIONS

This application is related to commonly-owned applications entitled "*Multiple Antenna Detecting and Selecting*" having U.S. patent application Ser. No. 08/855,242, filed May 15, 1997, and "*Antenna Mounting Assembly*," U.S. patent application Ser. No. 08/742,254, filed Oct. 31, 1996, both of which are incorporated herein by reference.

BACKGROUND OF THE INVENTION

I. Field of the Invention

The present invention relates to satellite communications systems. More specifically, it relates to a compact antenna that communicates with earth orbiting satellites. Still more specifically, the invention relates to a compact antenna having a plurality of antenna elements to provide maximum gain through all angles between about 10 and 90 degrees of elevation.

II. Description of the Related Art

In communication systems, low earth orbit (LEO) and medium earth orbit (MEO) satellites are increasingly being viewed as having great potential in satellite telephone communications. For example, plans are underway to put up constellations of LEO satellites that operate close to the earth's surface, in the range of 400 to 1000 miles above the earth's surface. Most commercial satellites today that handle long-distance phone calls, relay cable television, and provide direct-broadcast television are in geostationary earth orbit (GEO), 22,300 miles above the earth's surface. At that altitude and location, they move around the earth at the same rate as the earth rotates about its axis, making them appear to hover over the same point and allowing them to act like very tall transmission towers. The problem, however, is that relatively few positions are available on the geostationary arc, which is precisely above the equator. It takes powerful, costly rockets to boost heavyweight satellites into that position. And because they are so far away, it takes a quarter of a second for a signal to travel from earth to a geostationary satellite and back to earth. This delay is not material for television broadcasts or data transmissions. However, for voice phone calls, this delay can interfere with a lively back-and forth conversation.

There is practically no limit, however, to the number of satellites that can be placed in low earth orbit. Since LEO satellites are close to earth, there is essentially no delay to the signal, less radio energy is required, and phone batteries can be smaller. The satellites themselves can be smaller, cheaper, and easier to launch. Several satellite services operate using LEO satellites. Other satellite services expect to place satellites in orbit 6430 miles above the earth's surface in a Medium Earth Orbit (MEO). At that altitude, only 10 satellites are required, and the signal delay is minimal. Some of the techniques for managing big constellations, dozens or hundreds of satellites working together, were hypothesized initially for the so-called "Star Wars" missile-defense schemes.

A problem facing users of fixed phones that will communicate directly with LEO and MEO satellites is their ability to receive weak signals transmitted by the orbiting satellites. Currently, high gain dish antennas are used to communicate with LEO and MEO satellites. These satellites must be tracked in real-time in order to provide continuous, uninterrupted communications. This requires that the dish be mounted on a gimbal so that it can be electro-mechanically steered. Complicated dual-mode microwave feed systems and specialized auto-tracking receivers are needed to track the satellites. Complex algorithms have been developed to enable the dish to track the satellite. Also, complex electronics and control circuitry are required for this purpose. All these make the dish antenna very expensive. Use of these antennas for mobile and fixed phones would be cost prohibitive and impractical due to their complexity and the difficulty in calibrating and maintaining the systems.

One alternative to the steered dish antenna is an omni-directional antenna. The omni-directional antenna, however, typically has a lower gain than a steered dish antenna. In addition, the omni-directional antenna suffers from an environmental effect, known as "specular reflection," which causes signal fading. At angles near the horizon, the antenna picks up signals, in phase and out of phase, reflected from the ground. Thus, when a satellite is at or near the horizon, the antenna picks up undesired signals being reflected from the ground, which may, if out of phase, add destructively to signals received directly from a satellite.

Another alternative to the dish antenna is a beam forming array of smaller antenna elements, where a beam from each antenna element is electronically steered to track a moving satellite. This type of system is commonly known as a rotatable phased array system. Each antenna element, however, requires its own electronic and control circuitry, which makes a phased array system complex and expensive. Additionally, complex algorithms are required to enable the beams to track the moving satellite.

As a result, many in the satellite communications environment have realized that there is a need for a compact, low cost antenna which, at high gain, tracks LEO and MEO satellites. There is also a need for an antenna that provides improved immunity from environmental effects, such as specular reflections. There is also a need for an antenna that requires a minimum number of elements and thus less electronic and control circuitry. Furthermore, there is a need for an antenna for satellite communications systems that offers good signal reception without complex RF processing hardware or sophisticated beam alignment systems.

The present invention addresses the above-described needs. Briefly stated, the present invention is directed to a compact, low cost antenna that communicates with low and medium earth orbit satellites and provides maximum gain through all angles between 10 and 90 degrees of elevation. The present invention provides a simple, inexpensive alternative to expensive, complicated antennas currently being used to communicate with these satellites.

SUMMARY OF THE INVENTION

The present invention is directed to an antenna for communicating with a plurality of earth orbiting satellites, where each of the plurality of satellites is oriented, at any given time when in view of the antenna, at a particular elevation angle. The invention comprises a plurality of first antenna elements arranged about an axis and positioned to illuminate higher elevation angles. A second antenna element is positioned at the center of the first antenna elements and positioned to illuminate lower elevation angles. The arrangement of the first and second antenna elements is such that illumination toward the ground is minimized, thereby providing improved immunity to specular ground reflections.

According to the present invention, a plurality of microstrip patch elements are arranged about an axis and positioned to illuminate higher elevation angles. The number of micro-strip patch elements is determined by the minimum and average gain required for the antenna. A quadrifilar helix is positioned at the center of and between the micro-strip elements and positioned to illuminate lower elevation angles. To cover the range of elevations from 10 to 90 degrees, four micro-strip patch elements are oriented toward the horizon at 90 degree increments at azimuth and are tilted at 50 degrees in elevation. The micro-strip elements generate a 70 degree beamwidth omni-directional field pattern. The quadrifilar helix generates a high-gain, conical, narrow beam-width field pattern that is omni-directional in the azimuth.

The present invention can also provide two-way communications, i.e., transmit and receive capability. In order to provide transmit capability, a second quadrifilar helix is stacked on top of the first quadrifilar helix. The second quadrifilar helix is designed to cover elevation angles that span from 10 degrees to 90 degrees.

The present invention provides improved immunity to specular ground reflections by receiving signals only above 10 degrees angle and limiting reception below 10 degrees using the narrow beam quadrifilar helix. Also, the present invention provides continuous, uninterrupted communications by eliminating the "dead" period associated with conventional dish antennas.

Further features and advantages of the invention, as well as the structure and operation of an embodiment of the invention, are described in detail below with reference to the accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number.

The present invention will be described with reference to the accompanying drawings, wherein:

FIG. 5 is a simulated field pattern of a helix antenna;

FIG. 6 illustrates a measured field pattern of a helix antenna;

DETAILED DESCRIPTION OF THE PREFERRED EMBODIMENTS

1. Example Environment

Before describing the invention in detail, it is useful to describe an example environment in which the invention can be implemented. In a broad sense, the invention can be implemented in a communication system where LEO and MEO satellites communicate with ground based antennas.

Figure 1:
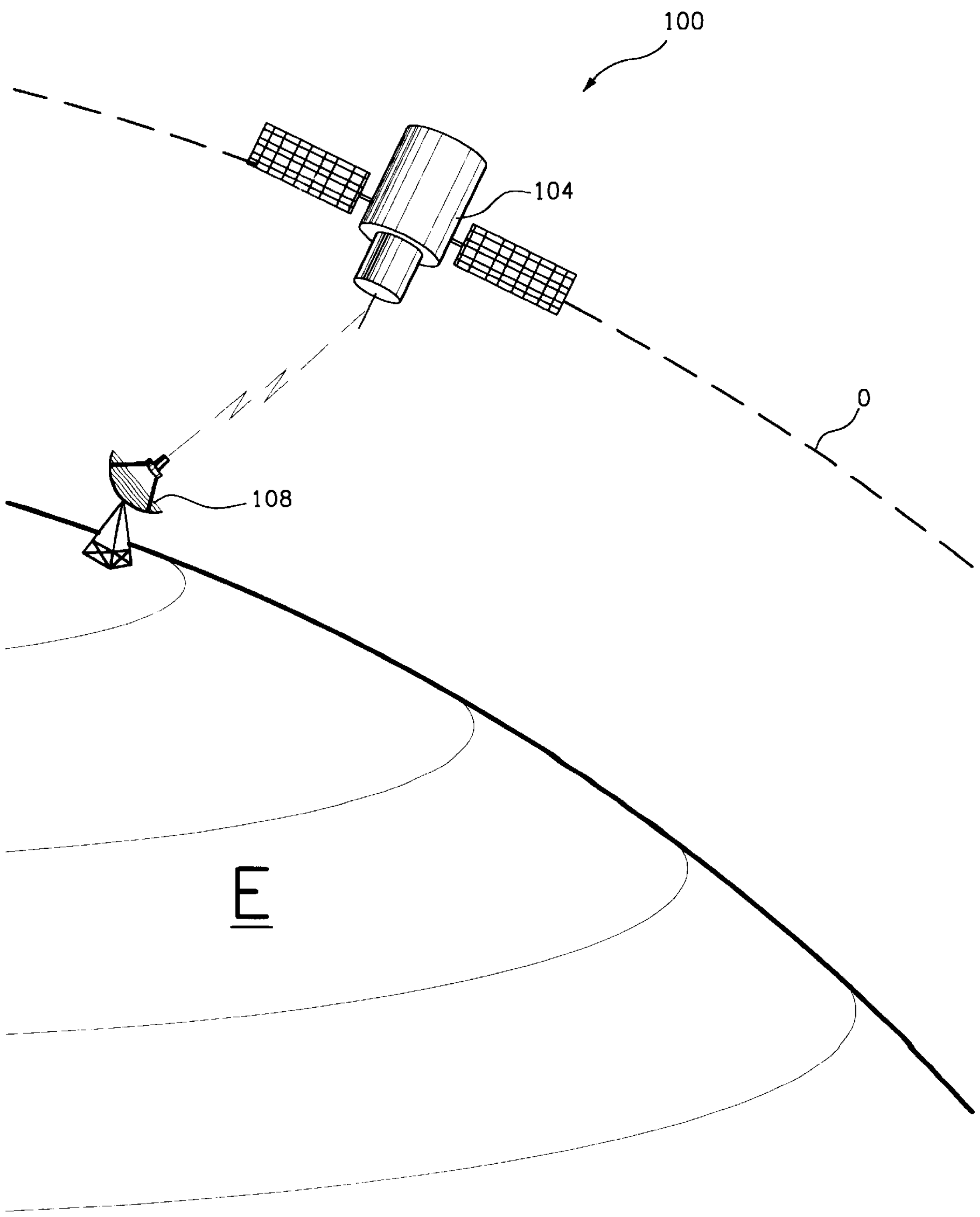
FIG. 1 illustrates a typical satellite communication system.

One such communication system 100 is illustrated in FIG. 1. Specifically, FIG. 1 shows a satellite 104 moving in an orbital path 'O'. A first parabolic dish antenna 108 is located effectively at or near a fixed phone location 106 on the surface of the earth 'E'. A second parabolic dish antenna 110 is located at a gateway 112 on the earth's surface. Signals are transmitted between phone 106 and gateway 112 via satellite 104 and antennas 108 and 110.

In operation, antennas 108 and 110 track satellite 104 in order to establish and maintain a communications link. This requires that the dish be mounted on a gimbal so that it can be electro-mechanically steered. As noted above, complex electronics and control circuits are required to enable the dish to track satellite 104, which makes antennas 108 and 110 expensive and complex. The complexity is increased when there are multiple satellites in view that must be tracked simultaneously by multiple antennas.

In addition, a conventional dish antenna of the type described with reference to FIG. 1 suffers from a "dead" period, during which time the dish must slew back to a position to intercept the next satellite pass. During this time, the dish antenna is unable to receive signals from the satellite.

The present invention is described in terms of this example environment. Description in these terms is provided for convenience only. It is not intended that the invention be limited to applications in this example environment. In fact, after reading the following description, it will become apparent to a person skilled in the relevant art how to implement the invention in alternative environments.

2. The Present Invention

The design of the antenna according to the present invention was influenced by several objectives. First, the antenna must be compact and easy to construct. This required that the antenna include a minimum number of elements, thus requiring less electronic and control circuitry, while satisfying high average and minimum gain requirements.

Next, the antenna must provide improved immunity from environmental effects, such as specular ground reflections and multi-path bounce. This requires that the antenna receive signals only above a threshold elevation angle and limit signal reception below the threshold elevation angle. This minimizes signal fading caused by specular ground reflections which can add destructively to signals directly received from the satellite. Also, having low gain below 10 degrees reduces the amount of background noise.

Further, the antenna must provide continuous, uninterrupted real-time coverage. In other words, there must not be any "dead" period.

The present invention is designed to meet the aforementioned requirements. Briefly stated, the present invention utilizes a hybrid approach by combining an array of micro-strip antennas and a quadrifilar helix antenna into a single antenna system. The helix is optimally designed to cover the lower elevation angles (10 degrees to 25 degrees), also known as the near-horizon angles. The field pattern of the helix is shaped like a donut, narrow in elevation and omni-directional in the azimuth. The micro-strip elements cover the higher elevation angles (10 degrees to 90 degrees).

The number of micro-strip elements, their orientation and tilt angle are determined based on several given requirements which will be discussed below.

Figure 2:
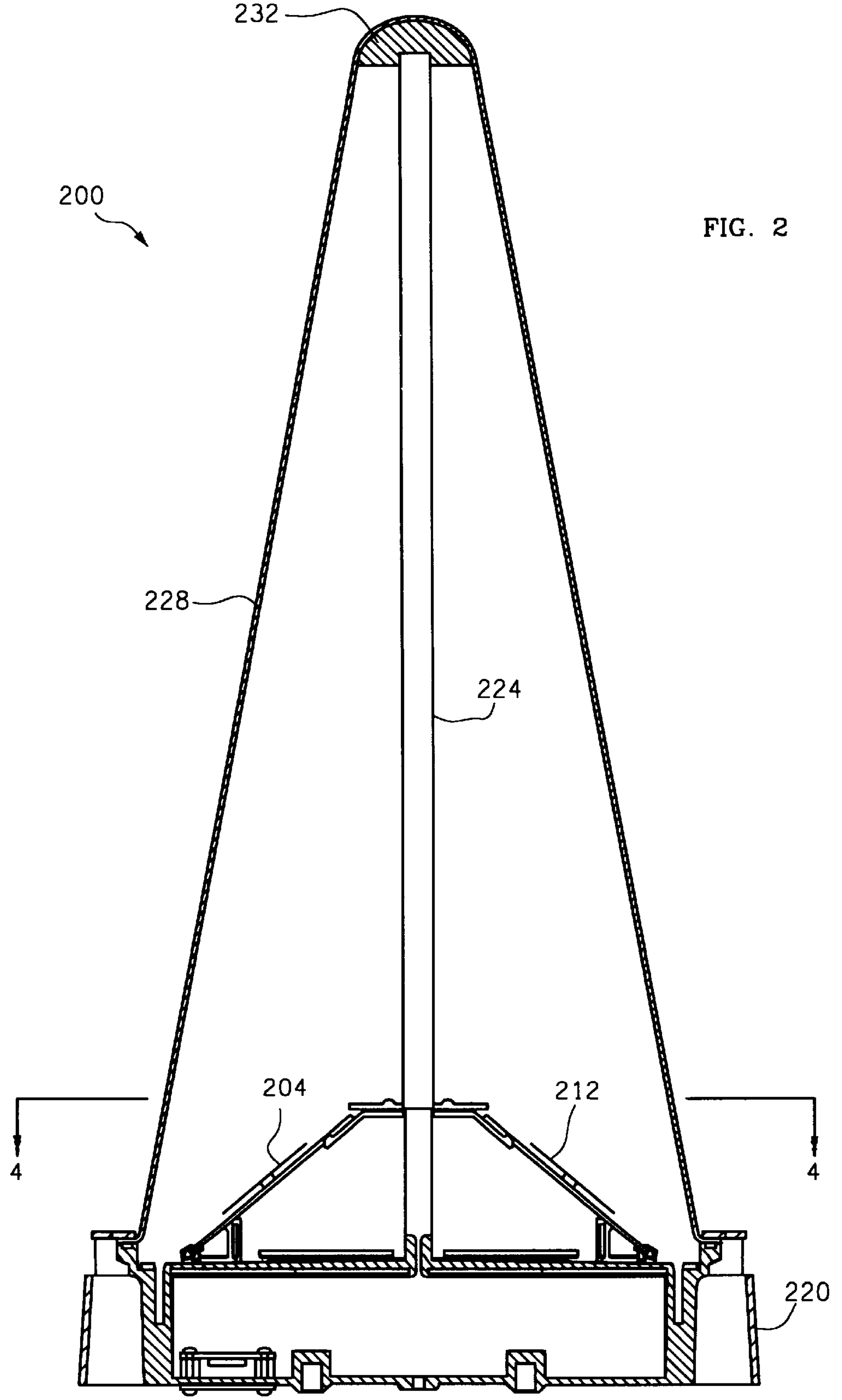
FIG. 2 illustrates an antenna according to one embodiment of the present invention.

FIG. 2 shows a side sectional view of an antenna 200 according to one embodiment of the present invention. Specifically, antenna 200 includes an array of four high gain micro-strip elements (only two micro-strip elements 204 and 212 are shown in FIG. 2). The micro-strip elements are positioned radially approximately equidistant from the center of a circular base 220 and are oriented at approximately 90 degree increments. A quadrifilar helix antenna 224 is positioned at the center of base 220 and is perpendicular to base 220.

A conical radome 228 is securely retained by base 220 and covers antenna 200. Radome 228 protects antenna 200 from rain, snow and other environmental effects, but has no effect on the field pattern of antenna 200. A foam 232 is inserted at the interior top of radome 228. The function of foam 232 is to retain the tip of quadrifilar helix 224 in an up-right position.

In one exemplary embodiment, each micro-strip element is a rectangular patch. The micro-strip elements are tilted at a 50 degree angle relative to base 220 to face outwardly and upwardly. Each micro-strip element has the following dimensions:

| | |
|---|---|
| length | 2.15 inches |
| width | 2.05 inches |
| thickness | 0.125 inches |

In this exemplary embodiment, antenna 200 is quite compact and has the following dimensions:

| | |
|---|---|
| overall height | 25.6 inches |
| diameter of the base | 12.7 inches |
| height of the helix (including transmitter) | 18 inches |
| diameter of the helix | 0.5 inches |

The quadrifilar helix antenna 224 (hereinafter helix 224) is selected for lower elevation angle coverage. Helix 224 is fabricated by twisting four conductor wires. Helix 224 is simple and inexpensive to fabricate. Simple low print and etch construction methods can be used to fabricate the antenna.

The axial length and pitch angle of helix 224 are selected to provide a high gain, narrow beam-width in the elevation plane and 360 degrees coverage in the azimuth. Specifically, helix 224 is designed to provide coverage in the near horizon elevation angles and covers between approximately 10 degrees and 25 degrees in the elevation angle. The peak radiation occurs at approximately 18 degrees.

In this exemplary embodiment, the dimensions of the helix antenna are as follows:

| | |
|---|---|
| length | 11.6 inches |
| diameter | 0.5 inches |
| pitch | 63 degrees |

Since helix 224 radiates a narrow beam-width, it is able to operate at a higher gain. The higher gain beam near the horizon minimizes ground illumination, thereby minimizing signal reception in the direction of the ground. This reduces signal fading caused by specular ground reflections which can add destructively to signals directly received from the satellite.

The micro-strip elements cover the higher elevation angles, between 25 degrees and 90 degrees. Since the lower elevation angles, between 10 degrees and 25 degrees, are covered by helix 224, fewer micro-strip elements are required to cover the remaining regions of the hemisphere. The minimum number of micro-strip elements needed depends on the minimum gain and the average directivity requirement. The tilt angle of a given micro-strip element depends on the minimum directivity requirement and the total number of micro-strip elements required to cover the required portion of the hemisphere.

According to the present invention, four micro-strip elements are needed to meet the minimum gain and the average directivity requirement. Based on the number (four) of micro-strip elements, it is determined that each micro-strip element must be tilted at a 50 degree angle in order to meet the minimum directivity requirement and also to provide coverage for the required portion of the hemisphere. The micro-strip elements are positioned perpendicular to each other. Each element covers 90 degrees in the azimuth. Thus, a combination of four micro-strip elements cover the entire 360 degrees in the azimuth.

At a 50 degree tilt angle, the micro-strip elements provide coverage from 25 degrees above horizon to zenith. As a result, the micro-strip elements limit signal reception below 25 degrees while maintaining coverage above 25 degrees in elevation. This minimizes signal fading caused by specular ground reflections which can add destructively to signals directly received from the satellite.

Figure 3:
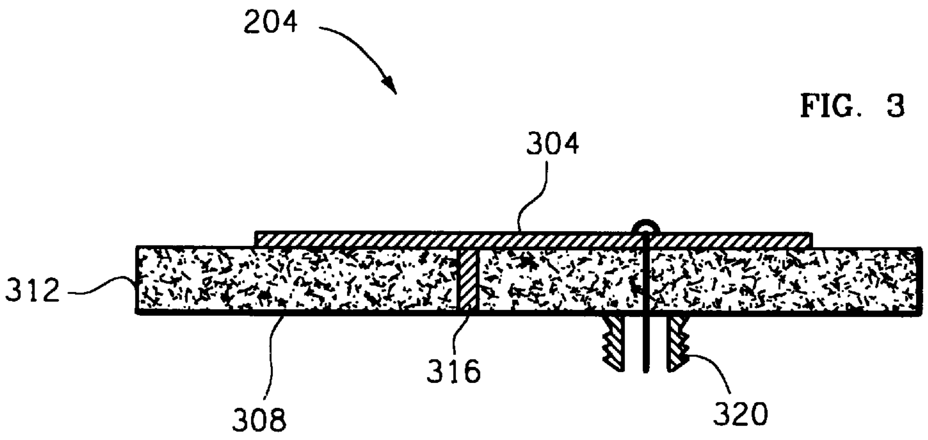
FIG. 3 illustrates a side sectional view of a micro-strip element in accordance with one embodiment of the present invention.

FIG. 3 illustrates a side sectional view of micro-strip element 204 in accordance with one embodiment of the present invention. Specifically, the micro-strip element includes a conductor plate 304 which is separated from a ground plane 308 by a dielectric substrate 312. A non-conductive post 316 retains conductor plate 304 above and substantially parallel to ground plane 308 and also maintains the separation between conductor plate 304 and ground plane 308.

In a preferred embodiment, air is selected as the dielectric substrate in order to satisfy a high average gain and a narrow beam-width requirement. The thickness of dielectric substrate 312 is approximately 0.125 inches. It will be apparent to those skilled in the relevant art that other dielectric materials can be used. However, the selection of air also results in high efficiency, good VSWR and low antenna noise temperature. Additional advantages of using air as the dielectric are low loss and lower manufacturing cost compared to the use of other dielectric materials.

Micro-strip element 204 is coupled to a receiver via a coaxial conductor 320. The inner conductor of coaxial conductor 320 is connected to conductor plate 304 at a point that is slightly offset by a predetermined amount from the mid-point of the conductor plate. This results in a circularly polarized field pattern. The outer conductor of coaxial conductor 320 is connected to ground plane 308.

Figure 4:
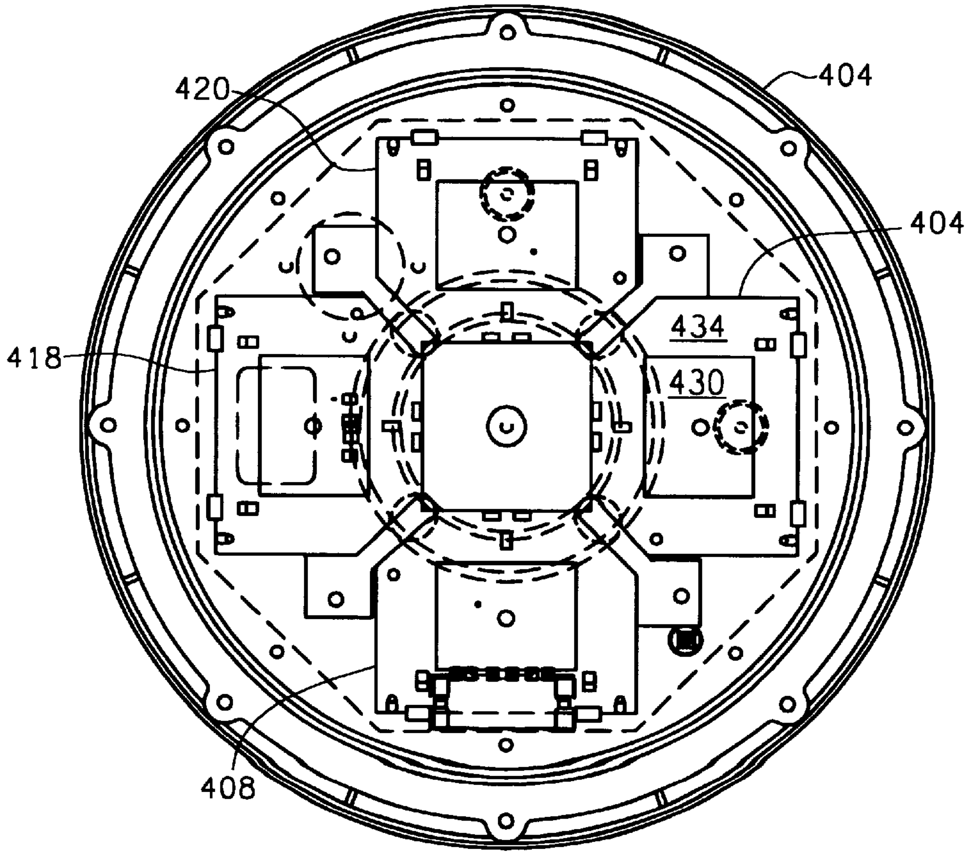
FIG. 4 shows a top view of the antenna of FIG. 2 along lines B—B.

FIG. 4 shows a top view of antenna 200 along lines B—B. Specifically, FIG. 4 shows a circular base 404, an array of four micro-strip elements 408, 412, 416 and 420, and a quadrifilar helix 424 extending upwardly from the center of the base. Although a circular base is a preferred design, it will be apparent to those skilled in the relevant art that other shapes, such as rectangular, hexagonal, octagonal, or square bases, could be used with equally good effect.

Each micro-strip element is comprised of a rectangular shaped conductor plate suspended over and parallel to a ground plane. For example, in micro-strip element 404, a conductor plate 430 is placed above ground plane 434. The conductor plate has a smaller area than the ground plane. Electronic circuitry (not shown) for controlling signals being sent to or from each micro-strip element 404 may be mounted beneath ground plane 434. The ground plane of the electronic circuitry may also form the ground plane for the micro-strip elements. This has the advantage of lowering manufacturing cost and permitting a compact and stable design.

FIG. 5 is a simulated field pattern of helix 224. Helix 224 exhibits a small beam area and, thus high directivity. The main lobe spans between 10 degrees and 25 degrees, and has a peak at approximately 18 degrees. The beam-width is approximately 20 degrees. FIG. 6 is an experimental result of helix 224 showing a field pattern. The measured field pattern closely resembles the simulation results of FIG. 5 and thus, corroborates the simulation results. Experimental results show a main lobe spanning between 10 degrees and 25 degrees and a peak at approximately 18 degrees.

Figure 7:
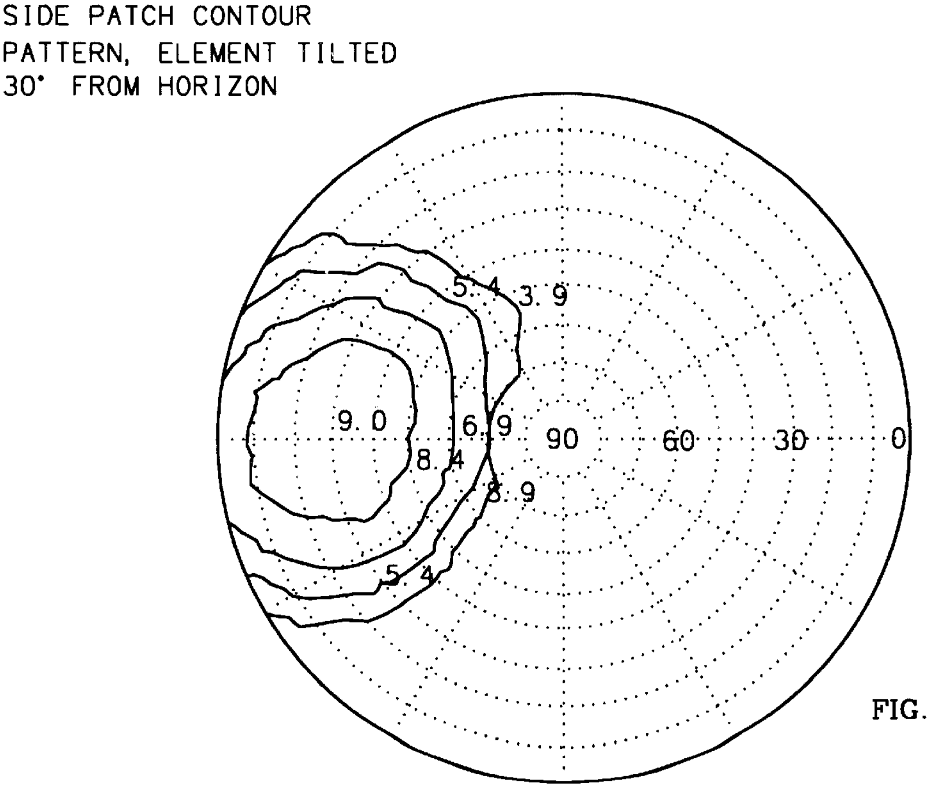
FIG. 7 is a measured field pattern of a micro-strip element.

FIG. 7 is a measured field pattern (top view) of a micro-strip element. The micro-strip element covers approximately 90 degrees in the azimuth.

Figure 8:
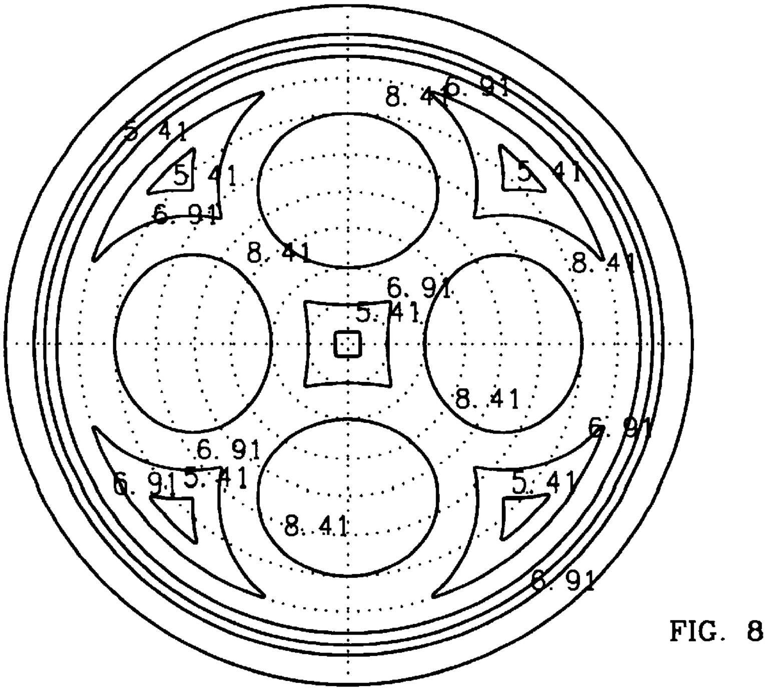
FIG. 8 is a simulated field pattern of four micro-strip elements and a helix.

FIG. 8 shows a simulated field pattern of four micro-strip elements 204, 208, 212 and 216, and helix 224. The field pattern of helix 224 is super-imposed on the field patterns of the micro-strip elements. The quadrifilar helix is fed by a quadrature hybrid etched on a printed wiring board (PWB)

Figure 9:
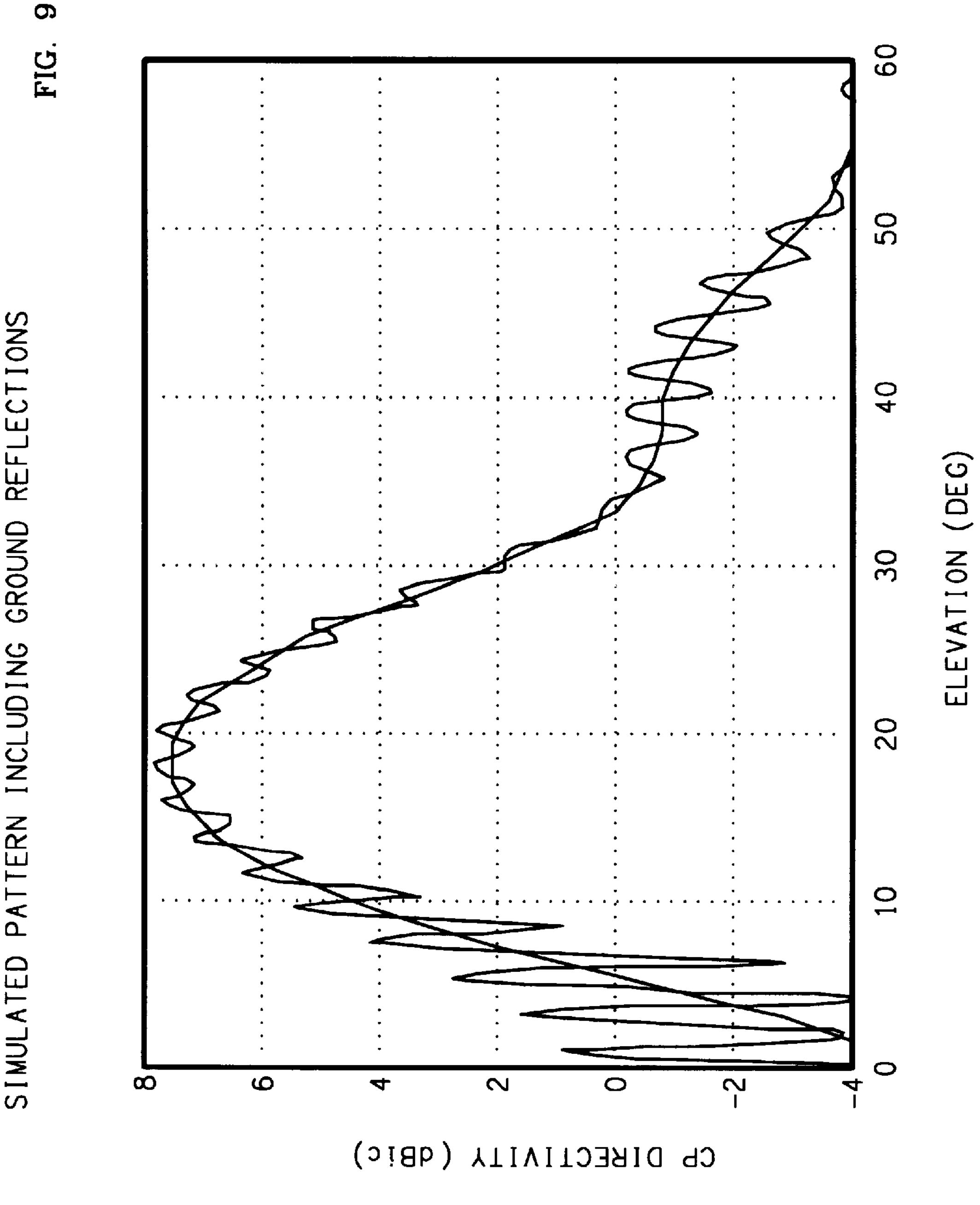
FIG. 9 depicts field pattern directivity and ground reflections for the helix antenna.

FIG. 9 is a graph depicting field pattern directivity and ground reflections vs. elevation angles for antenna 200. Peak directivity occurs at approximately 18 degrees. Ripple due to specular reflections is maximum between 0 degrees and 10 degrees and minimum between 10 degrees and 25 degrees.

Experimental results have shown that antenna 200 has the following properties:

| | |
|---|---|
| Operating Frequency | 2483.5 MHz to 2500 MHz |
| Polarization | Left Circular |
| Average Gain | 6.2 dB (circular polarized) nominal<br>5.5 dB (circular polarized) worst case |
| Minimum Gain (includes cable loss) | 2.7 dB (circular polarized) nominal<br>2.0 dB (circular polarized) worst case |
| Input VSWR | 1.5:1 |
| Coverage | 10 degrees to 90 degrees elevation<br>360 degrees azimuth |

The present invention utilizes a total of only five elements (four micro-strip elements and a helix) to track orbiting LEO and MEO satellites. Thus, the present invention provides an inexpensive and a simple alternative to complicated and expensive antennas, such as parabolic dish antennas and rotatable phased array antennas, that are currently used to track LEO and MEO satellites.

According to the present invention, at any time, an element that provides the best reception is selected to provide signals received from a satellite. This selection is made after a comparison with the signals received by the remaining four elements. This process is further described below. As discussed previously, however, between elevation angles of 10 degrees and 25 degrees, helix 224 is used exclusively to receive signals. At higher elevation angles, between 25 degrees and 90 degrees, one of the four micro-strip elements 204–216 is used to receive signals.

In one embodiment of the present invention, a dual channel receiver is used to receive outputs from any pair of elements. A transfer switch routes outputs from any pair of elements to the receiver. In operation, a given element is switched to the first channel and used to receive signals from a satellite. In parallel, signals from the remaining four elements are sequentially routed to the second channel. The signals from the second channel are compared to that of the first channel and the element offering the best reception is selected. Simple control algorithms and a signal routing network are used to implement the system. The dual channel receiver system, including the transfer switch, is described in the above-referenced '242 application.

As stated before, one of the objectives of the present invention is to eliminate the "dead" period associated with conventional dish antennas. In other words, the present invention is required to provide continuous, uninterrupted communications with orbiting LEO and MEO satellites.

According to the present invention, an antenna element providing the best reception for a satellite pass is selected to receive signals. For the next satellite pass, a second antenna element providing the best reception is selected while the preceding antenna element continues to receive signals at the end of the previous pass. At the end of the previous satellite pass, the system automatically switches to the next antenna element, thereby allowing continuous, uninterrupted communications.

The present invention can also provide two-way communications, i.e., transmit and receive capability. In order to provide transmit capability, a second quadrifilar helix antenna can be stacked on top of helix antenna 220. The second helix is exclusively used for transmitting signals to satellites. The second quadrifilar helix can be designed to generate a field pattern adequate for upper hemispherical coverage.

Figure 10:
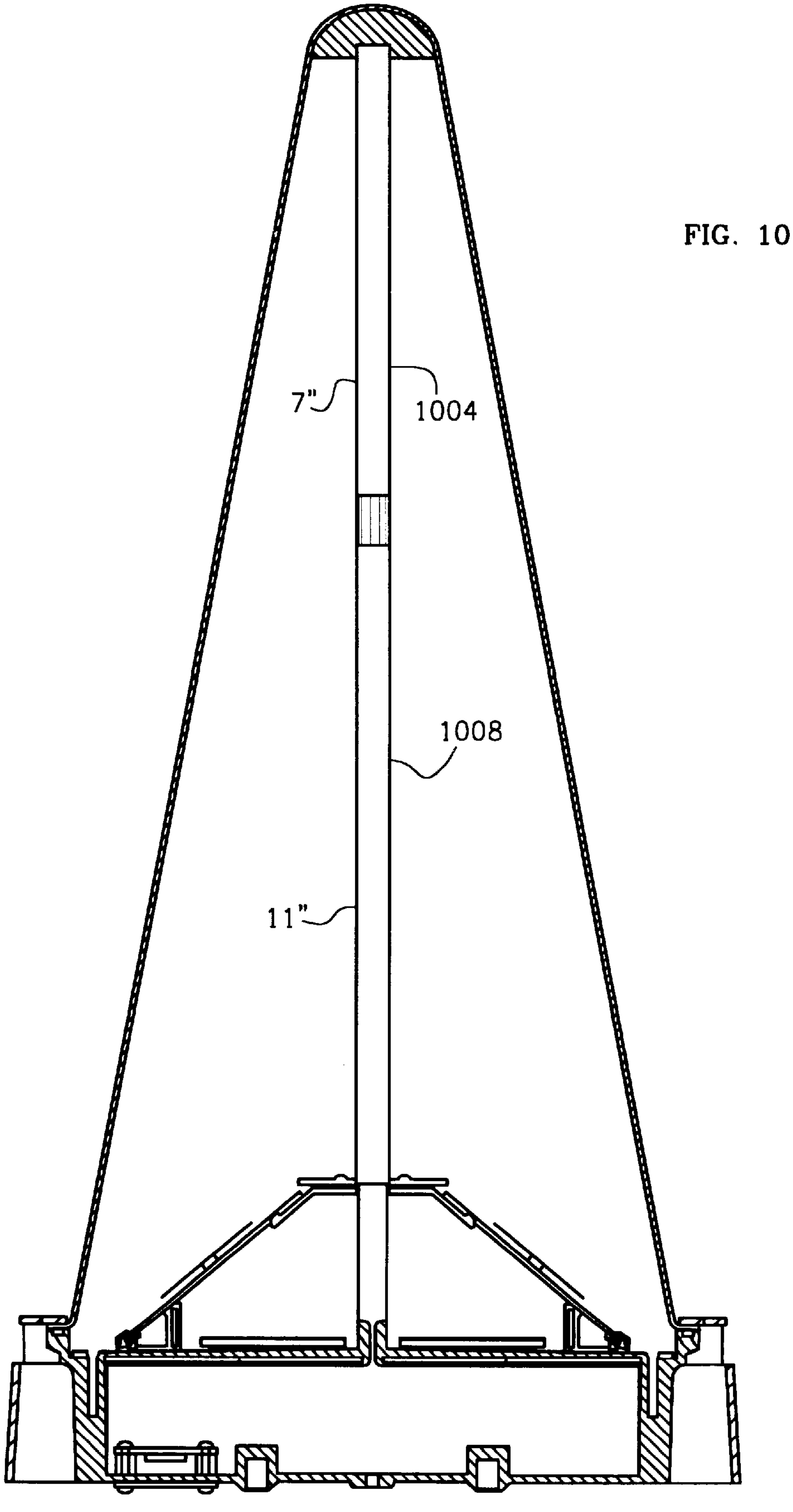
FIG. 10 shows an antenna having two-way communications capability in accordance with one embodiment of the present invention.

Referring to FIG. 10, a helix 1004 is stacked on top of helix 1008. In this embodiment, helix 1004 is used exclusively to transmit signals, while helix 1008 is used to receive signals from higher elevation angles (25 degrees to 90 degrees). The construction of helix 1004 is similar to helix 220, and will not be described herein. In one embodiment, helix 1004 can be etched on the same substrate as helix 1008, thereby simplifying fabrication and assembly cost. Helix 1004 is fed by a coaxial cable (not shown), running through the center of helix 1008.

Figure 11:
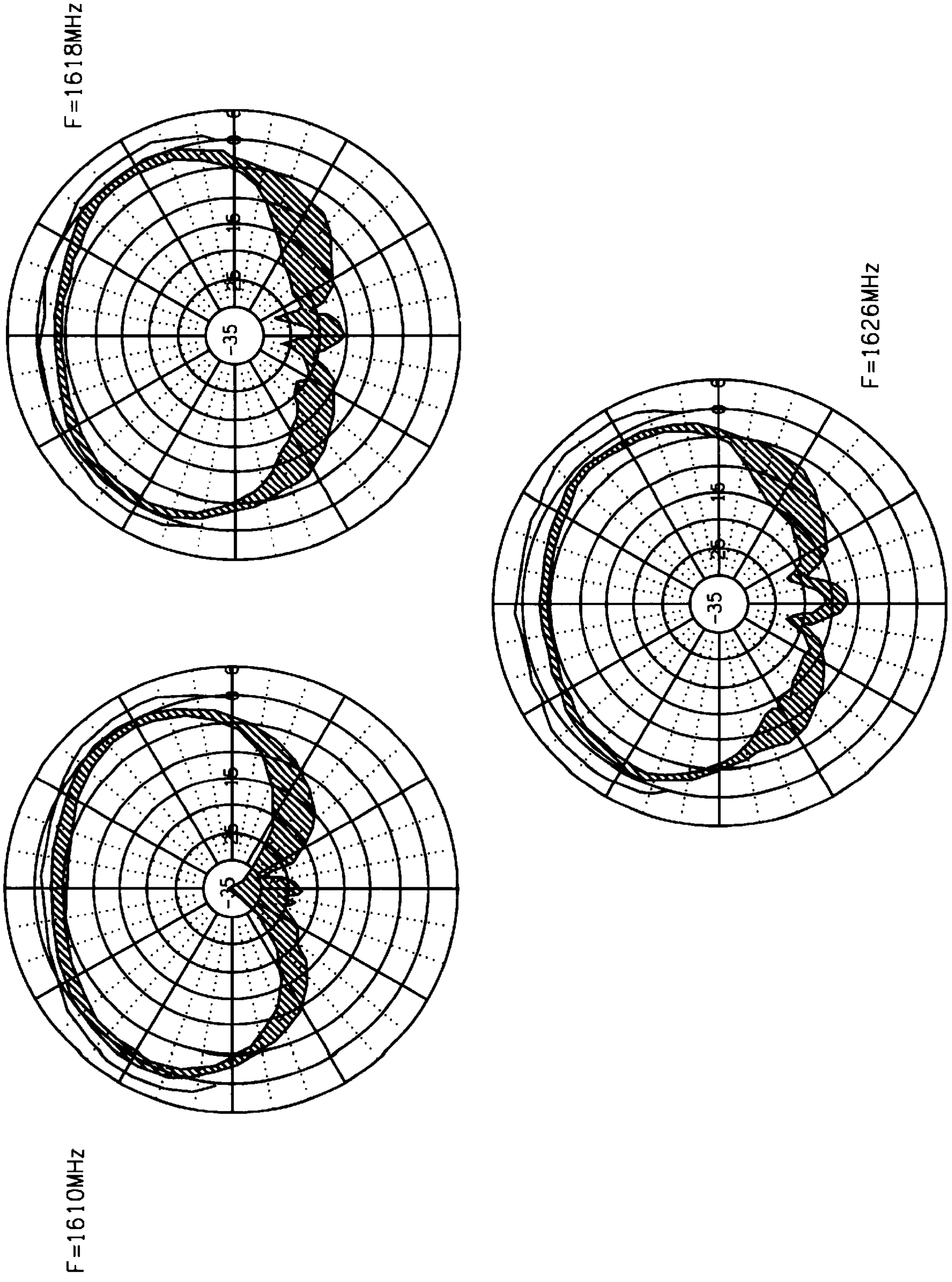
FIG. 11 is a simulated field pattern of a helix used as a transmit antenna.

FIG. 11 illustrates measured field patterns of helix 1004 operating at 1618 MHz. The field patterns indicate that helix 1004 provides adequate coverage for the upper hemisphere.

While the preferred embodiment of the present invention has been described above, it should be understood that it has been presented by way of example only, and not limitation. Thus, the breadth and scope of the present invention should not be limited by the above-described exemplary embodiment, but should be defined only in accordance with the following claims and their equivalents.

What we claim as our invention is:

1. An antenna for use in communicating between a plurality of earth orbiting satellites and a user terminal, each of the plurality of satellites being oriented, at any given time when in view of the antenna, at a particular elevation angle, comprising:

a plurality of first antenna elements arranged about a central axis to illuminate higher elevation angles and communicate within a pre-selected frequency range; and a second antenna element positioned along said central axis and positioned to illuminate elevation angles lower than said higher elevation angles and communicate within said pre-selected frequency range;

wherein said first and second antenna elements together minimize illumination toward the ground, thereby providing improved immunity to specular ground reflections.

2. The antenna according to claim 1, wherein said first antenna elements are micro-strip elements.

3. The antenna according to claim 1, wherein said second antenna element is a quadrifilar helix.

4. The antenna according to claim 1, wherein said lower elevation angles span from about 10 degrees to about 25 degrees.

5. The antenna according to claim 1, wherein said higher elevation angles span from about 25 degrees to about 90 degrees.

6. The antenna according to claim 1, wherein said first and second elements are used for receiving signals from satellites.

7. The antenna according to claim 1, wherein a third antenna element is positioned on top of the second antenna element.

8. The antenna according to claim 7, wherein said third antenna element is a quadrifilar helix used for transmitting of signals.

9. The antenna according to claim 1, wherein said second antenna element generates a high-gain, narrow beam-width field pattern in the elevation plane.

10. The antenna according to claim 1, wherein said second antenna element generates a field pattern that is omnidirectional in the azimuth plane.

11. The antenna according to claim 1, wherein said first antenna elements are positioned perpendicular to each other such that they are oriented toward the horizon at 90 degree increments and are tilted at 50 degrees, thereby forming a pyramidal shape.

12. The antenna according to claim 1, wherein said first antenna elements generate a field pattern that is omnidirectional in the azimuth plane.

13. An antenna assembly for use in communicating between a plurality of earth orbiting satellites and a user terminal, comprising:

a plurality of at least four planar microstrip antenna elements arranged about a central vertical axis at substantially equivalent angular spacings, each having a central vertical axis that is tilted at a pre-selected angle with respect to said vertical axis, and each having a radiation pattern configured to communicate signals at higher elevation angles and within a pre-selected frequency range, and in combination covering substantially an entire 360 degrees in the azimuth; and a multi-filar helical antenna element positioned along said central vertical axis, and configured to communicate signals at elevation angles lower than said higher elevation angles but above a pre-selected threshold elevation angle and within said pre-selected frequency range.

14. The antenna assembly of claim 13, wherein said threshold elevation angle is equal to or greater than 10 degrees.

15. The antenna assembly of claim 13, wherein said tilt angle is selected according to a minimum directivity requirement and a total number of micro-strip elements required to cover a desired portion of a hemisphere above said antenna.

16. The antenna assembly of claim 13, wherein the tilt angle is equal to or greater than 50 degrees.

17. The antenna assembly of claim 13, where in a second multi-filar helical antenna element is positioned on top of said multi-filar helical antenna, and configured to communicate signals using a second pre-selected frequency range.

18. The antenna assembly of claim 13, further comprising a dual channel receiver coupled to receive signal outputs from any pair of elements.

19. The antenna assembly of claim 18, further comprising a transfer switch for routing outputs from any pair of elements to said receiver.

20. A method of communicating between a plurality of earth orbiting satellites and a user terminal, comprising:

providing a plurality of at least four planar microstrip antenna elements arranged about a central vertical axis at substantially equivalent angular spacings, each having a central vertical axis that is tilted at a pre-selected angle with respect to said vertical axis;

configuring said planar microstrip antenna elements with a radiation pattern to communicate signals at higher elevation angles and within a pre-selected frequency range, and in combination to cover substantially an entire 360 degrees in the azimuth;

positioning a multi-filar helical antenna element along said central vertical axis; and configuring said multi-filar helical antenna element to communicate signals at elevation angles lower than said higher elevation angles but above a pre-selected threshold elevation angle and within said pre-selected frequency range.

21. The method of claim 20, further comprising selecting said threshold elevation angle to be equal to or greater than 10 degrees.

22. The method of claim 20, further comprising selecting said tilt angle according to a minimum directivity requirement and a total number of micro-strip elements required to cover a desired portion of a hemisphere above said antenna.

23. The method of claim 22, wherein the tilt angle is equal to or greater than 50 degrees.

24. The method of claim 20, wherein a second multi-filar helical antenna element is positioned on top of said multi-filar helical antenna, and configured to communicate signals using a second pre-selected frequency range.

25. The method of claim 20, further comprising coupling a dual channel receiver to receive signal outputs from any pair of elements.

26. The method of claim 25, further comprising routing outputs from any pair of elements to said receiver.

27. The method of claim 26, further comprising:

switching a given element to a first channel of said receiver to receive signals from a satellite; and sequentially routing signals from the remaining elements in parallel to a second channel of said receiver.

28. The method of claim 27, further comprising comparing signals from said second channel to that of the first channel, and selecting the element offering the best reception to receive signals.

29. The method of claim 27, further comprising comparing signals from said second channel to that of the first channel, and selecting a second element offering a best reception to receive signals while the preceding antenna element continues to receive signals; and automatically switching to the second antenna element, thereby allowing continuous, uninterrupted communications at a desired reception level.

30. The method of claim 20, wherein said first multi-filar helical antenna element is configured for use in transmitting signals to satellites.

31. The method of claim 24, wherein said second multi-filar helical antenna element is configured for use in receiving signals from satellites.

* * * * *